(12) United States Patent
Lang et al.

(10) Patent No.: US 12,390,903 B2
(45) Date of Patent: Aug. 19, 2025

(54) CLAMPING DEVICE AND WORKPIECE HOLDING DEVICE WITH A CLAMPING DEVICE

(71) Applicant: LANG TECHNIK GMBH, Holzmaden (DE)

(72) Inventors: Günter Lang, Wernau (DE); Philipp Lang, Holzmaden (DE)

(73) Assignee: LANG TECHNIK GMBH, Holzmaden (DE)

( * ) Notice: Subject to any disclaimer, the term of this patent is extended or adjusted under 35 U.S.C. 154(b) by 199 days.

(21) Appl. No.: 18/095,618

(22) Filed: Jan. 11, 2023

(65) Prior Publication Data
US 2023/0158642 A1  May 25, 2023

Related U.S. Application Data

(63) Continuation-in-part of application No. 17/619,042, filed as application No. PCT/EP2020/066101 on Jun. 10, 2020, now Pat. No. 11,554,453.

(30) Foreign Application Priority Data

Jun. 14, 2019 (DE) .......................... 102019116262.9
Apr. 5, 2022 (DE) ..................... 20 2022 101 810.3

(51) Int. Cl.
*B25B 5/00* (2006.01)
*B25B 5/06* (2006.01)

(52) U.S. Cl.
CPC ..................................... *B25B 5/06* (2013.01)

(58) Field of Classification Search
CPC .. B25B 5/00; B25B 5/06; B25B 5/062; B25B 5/16
See application file for complete search history.

(56) References Cited

U.S. PATENT DOCUMENTS 4,205,834 A * 6/1980 Demuth .................. B23F 23/12
269/258
5,167,405 A * 12/1992 Cayley, Jr. ........... B23Q 1/0072
269/95

(Continued)

FOREIGN PATENT DOCUMENTS

DE    102014112843 A1    3/2016
DE    202018105390 U1    9/2018

(Continued)

OTHER PUBLICATIONS

German Office Action for German Application No. 102019116262.9; Date of Mailing: Apr. 3, 2020; 7 Pages.

(Continued)

*Primary Examiner* — Lee D Wilson
(74) *Attorney, Agent, or Firm* — CANTOR COLBURN LLP

(57) ABSTRACT

A clamping plate for receiving at least one workpiece clamping device or a workpiece, the clamping plate including: a support surface for the at least one workpiece clamping device or the workpiece, the support surface is penetrated by a plurality of openings for receiving clamping bolts of the at least one workpiece clamping device, clamping slides being arranged in the clamping plate, the clamping slides each project with one end into one of the plurality of openings in a clamping position and are located outside the one of the plurality of openings in a release position, —a clamping wedge, which is movably arranged in the clamping plate and is operatively connected to the clamping slides via at least one of a body formed resiliently yielding in several directions, a hollow body, an annular body, and a hollow cylinder.

19 Claims, 9 Drawing Sheets

(56) References Cited

U.S. PATENT DOCUMENTS

| 9,902,033 | B1 | 2/2018 | Taylor et al. | |
|---|---|---|---|---|
| 10,603,750 | B1 | 3/2020 | Taylor et al. | |
| 11,090,775 | B2* | 8/2021 | Chou | B23Q 1/0072 |
| 11,554,453 | B2* | 1/2023 | Lang | B23Q 1/0072 |
| 2004/0256780 | A1* | 12/2004 | Lang | B23Q 1/0072 |
| | | | | 269/309 |
| 2013/0168913 | A1* | 7/2013 | Schluessel | B23Q 1/0072 |
| | | | | 269/309 |
| 2015/0054211 | A1* | 2/2015 | Hediger | B23Q 17/005 |
| | | | | 269/309 |
| 2019/0160612 | A1 | 5/2019 | Schanz | |
| 2020/0368878 | A1* | 11/2020 | Dannecker | B25B 5/166 |
| 2022/0212299 | A1* | 7/2022 | Lang | B23Q 1/0072 |
| 2023/0158642 | A1* | 5/2023 | Lang | B23Q 1/0072 |
| | | | | 269/217 |

FOREIGN PATENT DOCUMENTS

| EP | 2363225 A1 | 9/2011 |
|---|---|---|
| JP | S5973622 A | 4/1984 |
| WO | 03039807 A1 | 5/2003 |

OTHER PUBLICATIONS

International Search Report and Written Opinion for International Application No. PCT/EP2020/066101; Date of Completion: Sep. 18, 2020; Date of Mailing: Oct. 29, 2020; 11 Pages.

Translation of International Search Report for International Application No. PCT/EP2020/066101; Date of Completion: Sep. 18, 2020; Date of Mailing: Oct. 29, 2020; 2 Pages.

Translation of Written Opinion for International Application No. PCT/EP2020/066101; International Filing Date: Jun. 10, 2020; Date of Mailing: Oct. 29, 2020; 4 Pages.

* cited by examiner

CLAMPING DEVICE AND WORKPIECE HOLDING DEVICE WITH A CLAMPING DEVICE

CROSS-REFERENCE TO RELATED APPLICATIONS

This application is a continuation-in-part application of U.S. Patent Application Ser. No. 17/619,042 filed on Dec. 14, 2021, which is a U.S. National Stage of PCT Application No. PCT/EP2020/066101 filed on Jun. 10, 2020, which claims priority to German Patent Application No. 10 2019 116 262.9 filed on Jun. 14, 2019 and entitled "CLAMPING DEVICE AND WORKPIECE HOLDING DEVICE WITH A CLAMPING DEVICE", the contents each of which are incorporated herein by reference thereto.

This application also claims priority under 35 U.S.C. § 119 to the following German Patent Application No. 20 2022 101 810.3, filed on Apr. 5, 2022, the entire contents of which are incorporated herein by reference thereto.

BACKGROUND

The invention refers to a clamping device for clamping a support body. The support body can comprise a holding device for holding a workpiece. With such clamping devices workpieces held on the support body can be clamped in a machine tool with high position accuracy. Particularly, clamping devices can be present in different machining stations or in different machine tools such that a uniform clamping is allowed in all stations or machine tools.

Such a clamping device is, e.g. known from WO 03/039807 A. The clamping device has a base body having an abutment surface and receptacle holes for clamping bolts of the support body. A clamping body having a clamping end and an operating end is assigned to each receptacle hole. The clamping end of each clamping body can act on a clamping bolt arranged in a receptacle hole and thus clamp the support body on the base body.

In an embodiment of the clamping device known from WO 03/039807 A1 the clamping bodies are arranged in pairs respectively and are moved along a common axis in a movement direction between a clamping position and a release position. All of the clamping bodies are supported in a manner to be movable relative to each other in this movement direction. In other embodiments the clamping bodies are arranged such that their longitudinal axis intersect in a common center point. A common hydraulic cylinder or a common rotor with multiple curved surfaces can act on or can move the clamping bodies.

The known clamping device has proven itself. Starting from the prior art it can be considered as object of the present invention to improve the clamping accuracy and to concurrently guarantee a simple configuration of the clamping device.

The invention also relates to a clamping plate for receiving at least one workpiece clamping device.

DE 101 55 077 B4 describes a clamping device which has a vice. The vice is formed to clamp workpieces, for example, between two jaws that can move against each other. On its lower surface, the vice has clamping bolts by means of which it can be fastened to a clamping plate with repeat accuracy. The clamping plate is also referred to as a "reference plane plate". The clamping plate has openings into which clamping bolts are held by means of a tightening device arranged in the clamping plate. The clamping bolts are both pulled axially into the openings and pressed against the opening wall to find a precise contact there. The reference plane plate has three or four openings to accommodate workpiece clamping devices with three or four clamping bolts. The tightening device has slides which are movable radially to the openings and can be actuated via a wedge-slide mechanism by means of a screw.

U.S. Pat. No. 5,167,405 also discloses a workpiece clamping device and an associated clamping plate with slides for tightening clamping bolts which project away from the lower surface of the workpiece clamping device and are received by openings in the clamping plate. The slides are actuated by a central eccentric shaft arranged in the clamping plate.

It is also known from DE 10 2017 122 112 A1 to provide a workpiece clamping device for clamping workpieces, the two clamping jaws of which are individually supported on separate linear guides spaced apart from one another. A threaded spindle mounted centrally in a bearing device engages with both clamping jaws. The two linear guides and the bearing device are in turn mounted on a clamping plate, referred to here as the base plate.

BRIEF SUMMARY

This object is solved by a clamping device as well as a workpiece holding device with a clamping device. Disclosed is a clamping device for clamping of a support body, including: a base body that comprises an abutment surface on a clamping side of the base body, the abutment surface having multiple receptacle holes that open toward the clamping side, the multiple receptacle holes each being configured for location of one of a plurality of clamping bolts of support body; multiple clamping bodies that are linearly movably supported in or on the base body along a longitudinal axis of the base body, the multiple clamping bodies can be moved between a clamping position and a release position by means of an operating device; and wherein longitudinal axes of the multiple clamping bodies define multiple points of intersection with respect to each other.

The clamping device according to the invention is configured for clamping a support body. It has a base body having a clamping side. The base body comprises an abutment surface on the clamping side. The abutment surface is configured to abut against a counter abutment surface of the support body, if the support body is clamped on the base body. The abutment surface can be continuously or can be defined by multiple surface sections arranged distant from one another. The abutment surface is preferably orientated parallel to a plane that is spanned by a first direction and a second direction.

On the clamping side the base body further comprises multiple receptacle holes that are open toward the clamping side. The receptacle holes can open into the abutment surface or can be arranged with distance to the abutment surface. Each receptacle hole is configured to at least partly locate a clamping bolt of the support body therein. Preferably the receptacle holes extend parallel to each other in a direction orthogonal to the abutment surface.

Multiple clamping bodies are arranged in or on the base body. Preferably exactly one clamping body is assigned to each receptacle hole. The clamping bodies are supported in a linearly movable manner along their longitudinal axes. The clamping device has an operating device that is configured to move all of the clamping bodies between a clamping position and a release position. Each clamping body has a clamping end that is assigned to one of the receptacle holes and that projects in the assigned receptacle hole in the clamping position. In the release position each clamping body is farther away from the center axis of the receptacle hole and the clamping end does not project or project less into the receptacle hole than in the clamping position.

The longitudinal axes of the clamping bodies of a common clamping body group define multiple intersection points, particularly at least three and preferably four intersection points. Due to this arrangement of the longitudinal axes of the clamping bodies, such that multiple intersection points are defined, a very accurate positioning can be achieved. Remaining inaccuracies in a rotary degree of freedom around an axis orientated orthogonal to the abutment surface can be eliminated. In the prior art longitudinal axes are either identical or intersect in one single intersection point. If all of the longitudinal axes intersect in one common point, a positioning inaccuracy around an axis extending through the intersection point of all of the longitudinal axes of the clamping bodies remains depending on the manufacturing accuracy.

The clamping bodies can form multiple clamping body groups. The longitudinal axes of the clamping bodies of a common clamping body group can define one intersection point respectively. In the case of two clamping body groups, for example, a first intersection point and a second intersection point are defined. The first intersection point and the second intersection point are preferably arranged along a straight line extending in a first direction.

The longitudinal axis of a clamping body of one clamping body group preferably defines a third intersection point together with a longitudinal axis of a clamping body of another clamping body group. The longitudinal axes of two other clamping bodies of these clamping body groups can define a fourth intersection point. The third intersection point and the fourth intersection point can be located on a common straight line that is preferably orientated in the second direction.

It is advantageous, if multiple clamping body groups are present having two clamping bodies respectively. For example, a first clamping body group having a first clamping body and a second clamping body can be present as well as a second clamping body group having a third clamping body and a fourth clamping body. It is particularly advantageous, if the longitudinal axis of the clamping bodies define at least four intersection points. Preferably these four intersection points represent the corners of a polygon that particularly has the form of a rhombus.

In a preferred embodiment each clamping body has an operating end opposite its clamping end that is assigned to an operating body of the operating device and preferably abuts against this operating body. The at least one operating body of the operating device is preferably supported in a linearly movable manner in the first direction. It is configured to act on the operating ends of multiple clamping bodies of a common clamping body group. Preferably the clamping body group comprises exactly two clamping bodies. Further preferably multiple clamping body groups and particularly exactly two clamping body groups are provided to each of which one operating body is assigned. By displacing of the operating body the clamping bodies of the assigned clamping body group can be displaced as well in order to switch them between the release position and the clamping position. The longitudinal axes of the clamping bodies of a common clamping body group are particularly neither arranged parallel to each other, nor congruent. They stand obliquely to each other and obliquely to the first direction and/or obliquely to the second direction. Particularly two operating bodies are present that are movably supported in first direction.

By means of the operating body, the clamping bodies can be moved between the release position and the clamping position. In the clamping position each clamping body is configured to act on a clamping bolt arranged in a receptacle hole, particularly with a force that comprises force components orthogonal to the abutment surface in the first direction and the second direction.

Due to this oblique orientation of the longitudinal axes of the clamping bodies, a simple possibility is provided to apply the clamping bolts with force components that act in two spatial directions, according to the example in the first direction and the second direction. In doing so, the support body can be exactly positioned relative to the base body in the first direction and the second direction in which the abutment surface extends.

The operating device operates preferably mechanically and is particularly free of fluidic force transmission units. Preferably the coupling between the at least one operating body and the assigned clamping bodies is a coupling that only transmits pressing or thrust forces and thus no coupling that transmits traction forces. This means the operating body can act on the assigned clamping bodies of a common clamping body group in a pushing manner, particularly for switching the clamping bodies in the respective clamping position, but can however transmit no traction force for counter movement. Particularly the operating body is configured to push the assigned clamping bodies from the release position into the clamping position without traction coupling to the clamping bodies that would allow pulling them from the clamping position back into the release position. Thereby a very simple mechanical configuration of the operating device is obtained.

Due to the mechanical operating device, each clamping body is moved in a path-controlled manner in the respective clamping position. It can be guaranteed that the movement paths of the clamping bodies of a common clamping body group have equal amounts. In addition, it can also be guaranteed that the movement paths of all clamping bodies into the respective clamping position have equal amounts. This increases the precision during clamping. By operating the clamping bodies by means of at least one linearly movable operating body and by providing one or more clamping body groups, the receptacle holes can also be arranged with large distance in the first direction and/or the second direction from each other without problems. The operating device is preferably self-locking. Thereby an unintentional disengaging or releasing of the clamping bodies or movement of the clamping bodies out of their clamping positions is avoided.

Preferably an operating body directly abuts on the operating ends of the clamping bodies of the assigned clamping body group.

The operating device preferably comprises one drive source, e.g. a drive element that can be operated by an operating person or a robot, wherein the drive source can move all of the clamping bodies from a release position into the respective clamping position during operation. For example, a wedge gear coupling exists between this drive source and the clamping bodies.

It is further advantageous, if at least one of the receptacle holes is arranged with distance in the first direction from one of the other receptacle holes and/or at least one of the receptacle holes is arranged with distance in the second direction from one of the other receptacle holes. Preferably the receptacle holes define the corners of a polygon. The number of receptacle holes is preferably an even number. Preferably four receptacle holes are provided.

It is in addition advantageous, if at least one longitudinal axis of a clamping body and particularly all of the longitudinal axes of all of the clamping bodies are orientated obliquely to the first direction and obliquely to the second direction. In doing so, a force can be applied to the clamping bolts via all of the clamping bodies having a force component in the first direction as well as in the second direction.

It is in addition advantageous, if the at least one operating body comprises a front end assigned to the operating ends of the clamping bodies of the assigned clamping body group. On the front end at least one slant is provided that extends obliquely to the first direction and/or to the second direction. Due to this slant, a wedge surface gear coupling can be obtained between the operating body and the clamping bodies being in contact with the operating body. The abutment between the at least one slant and the respective operating end of a clamping body is preferably two-dimensional, but can as an alternative also be line-shaped or point-shaped.

It is advantageous, if the operating device comprises a main body that is configured for acting on the at least one operating body. Particularly the main body is arranged in a displaceable or linear movable manner. Preferably the main body is linearly movably arranged in the second direction.

The main body can have at least one main body surface that extends obliquely to the first direction and/or the second direction. Against this main body surface the at least one operating body can abut preferably two-dimensionally or as an alternative in a line-shaped or point-shaped manner.

Preferably one single main body is provided for operation or displacement of all present operating bodies. The switching movement of all clamping bodies between the release position and the clamping position can be initiated by means of the main body.

The main body, the at least one operating body and the clamping bodies are thus linearly displaceably supported either in the first direction or in the second direction or obliquely to the first direction and the second direction. This operating device can be very simply integrated in a plate-shaped base body and can be realized in a flat and space-saving manner.

The clamping device comprises another inventive aspect that it can be realized independent from the orientation and arrangement of the clamping bodies, the at least one operating body and the main body described above. Thereby at least one guide channel is provided in the base body, wherein a clamping body is arranged in each guide channel. The at least one operating body and/or the main body can be arranged in addition also in one further guide channel respectively.

Each guide channel has two opposed channel walls facing one another. Preferably the channel walls are formed by opposite groove side walls that are connected with each other inside the base body via a groove bottom. The groove is open opposite the groove bottom and preferably closed by a cover that can be releasably attached on the base body. A guide wall section is present in each channel wall. The clamping body or the operating body or the main body abuts only against the guide channel in the area of the two opposite guide channel walls and is apart therefrom arranged with distance to the channel walls. Preferably also a distance exists between the bottom and/or the cover and the body arranged in the guide channel, i.e. the clamping body or the operating body or the main body. In doing so, the friction between the guide channel and the body respectively displaceably arranged therein can be adjusted in a defined manner or minimized. Preferably the contour of the guide channel matches the outer contour of the body (i.e. clamping body or operating body or main body) displaceably supported therein only in the areas of the guide wall sections. Outside of the guide wall sections the guide channel can have an arbitrary contour and the channel walls can be orientated parallel to each other outside the guide wall sections, for example, and can extend parallel to a common center plane that extends along the center of the guide channel respectively.

Preferably the guide wall sections can be configured in a trough-shaped manner. The concave-curved trough can have a radius matching the outer radius of an outer surface area of the movably supported clamping body or operating body or main body.

Preferably the clamping bodies and/or operating body and/or main body have a cylindrical section between their opposite ends that abuts against the guide wall sections.

In all embodiments of the clamping device described above it can be advantageous, if a biasing arrangement is present. The biasing arrangement can bias or urge the clamping bodies in their respective release positions. In their initial position in which they are not subject to an action of an operating body the clamping bodies are therefore in their release position. Preferably the biasing arrangement has one biasing element and particularly exactly one biasing element for each clamping body group. In a preferred embodiment the biasing element is supported directly on the clamping bodies of the clamping body group and is particularly not directly attached to the base body or supported on the base body. In an embodiment the biasing element effects a traction force between the clamping bodies of the clamping body group toward the respective operating body. For example, the biasing element can be a tension spring. Particularly the operating device is, apart therefrom, free of biasing elements that exclusively engage on the clamping bodies or are arranged on the clamping bodies.

A workpiece holding device according to the invention comprises a clamping device according to one of the embodiments described above. In addition, a support body having a holding side and an attachment side is provided. The attachment side is preferably facing away from the holding side or provided opposite to the holding side on the support body. For example, the support body can be configured as support plate. On the attachment side a counter abutment surface is provided. The counter abutment surface is configured to abut against the abutment surface of the base body, if the connection between the support body and the clamping device is established. Multiple clamping bolts project from the support body on the attachment side. Preferably the clamping bolts extend parallel to each other. The number of clamping bolts correspond particularly to the number of receptacle holes. If the connection is established, one clamping bolt projects into one receptacle hole respectively. The arrangement pattern or the distances between the clamping bolts therefore correspond to the arrangement pattern or the distances between the receptacle holes.

Particularly each clamping bolt has an impingement surface that can be provided by a cone shell surface, for example. The at least one impingement surface extends obliquely to the extension direction of the respective clamping bolt. If the clamping bolt is arranged in the assigned receptacle hole, the impingement surface extends obliquely to the first direction and obliquely to the second direction and obliquely to the extension direction of the clamping bolt.

If the assigned clamping body acts on the impingement surface during clamping of the support body on the base body, force components are created in all three spatial directions. The counter abutment surface is pulled against the abutment surface orthogonal to the first direction and orthogonal to the second direction. Concurrently, the clamping bolt is pushed in the first direction and the second direction by the clamping body. The clamping bolts are thus subject to a traction force parallel to their extension direction and are concurrently pushed away from each other in the first direction and the second direction, such that a precise positioning and orientation of the support body on the base body occurs.

An object of the present disclosure is to have all clamping slides act on the clamping bolts with essentially the same forces.

Disclosed is a clamping plate for receiving at least one workpiece clamping device or a workpiece, the clamping plate including: a support surface for the at least one workpiece clamping device or the workpiece, the support surface is penetrated by a plurality of openings for receiving clamping bolts of the at least one workpiece clamping device, clamping slides being arranged in the clamping plate, the clamping slides each project with one end into one of the plurality of openings in a clamping position and are located outside the one of the plurality of openings in a release position, a clamping wedge, which is movably arranged in the clamping plate and is operatively connected to the clamping slides via at least one spring means.

The clamping plate according to the present disclosure serves to receive at least one workpiece clamping device, for example in the form of a vice which has a flat base surface from which a plurality of clamping bolts project away. The clamping plate according to the present disclosure can also be used for directly receiving a workpiece to whose base surface clamping bolts have been attached in a preparatory operation. The following description of the clamping plate and the workpiece clamping device to be mounted with it applies equally to clamping plates which directly receive a workpiece provided with clamping bolts.

The clamping plate has a support surface for this or a similar workpiece clamping device, with several openings being provided in the support surface for receiving the clamping bolts of the workpiece clamping device. A tightening device is provided in the clamping plate, which serves to fix and position the clamping bolts in the openings. For this purpose, the tightening device has several clamping slides, whereby, at least preferably, exactly one clamping slide is assigned to each opening. The clamping slides are each movable radially relative to their openings between a clamping position and a release position. In the clamping position, they are located with a preferably wedge-shaped end inside the opening, while in a release position they are located completely outside the opening. The clamping slides are configured to press the clamping bolts against the opposite bore wall, which is preferably formed as a reference surface. As a result of the wedge shape of the end of the clamping slide that enters the opening, the clamping bolt is simultaneously pulled down in the axial direction so that the lower surface of the workpiece clamping device is pressed against the support surface of the clamping plate.

A clamping wedge being also a part of the tightening device and used to actuate the clamping slides of the tightening device is arranged in the clamping plate so that it can move, preferably linearly, and to which the clamping slides are operationally connected via at least one spring means. The spring means is preferably a hard spring which transmits the necessary actuating force for the clamping slide from the clamping wedge to the clamping slide when deformed by a few hundredths of a millimeter. Preferably, the spring is a non-linear spring with a digressive characteristic.

The spring means is used to transmit the actuating force from the clamping wedge to the clamping slide. Each clamping slide can be assigned a spring acting much more weakly in the opposite direction, by means of which the clamping slide is preloaded to its release position. This makes it easier to release the workpiece clamping device from the clamping plate.

The clamping wedge preferably has clamping surfaces arranged diametrically opposite each other, the distance between which varies along its direction of movement. The surfaces can be flat surfaces or curved surfaces. The clamping wedge serves to urge two force transmission elements away from each other when it is moved in the clamping direction. The force transmission elements can be formed by the spring means by means of which the clamping force is transmitted from the clamping wedge to the clamping slides.

The spring means can be formed as a body resilient in several radial directions. Preferably, it is resilient in the longitudinal directions of the two clamping slides in contact with it and also in the direction away from the wedge (radially to the clamping rod). The body forming the spring means can, for example, be a hollow body, in particular an annular body such as a hollow cylinder or other rotationally symmetrical body. The axis of symmetry of this body is preferably oriented transverse to its displacement and force transmission direction.

This can have a constant or also varying wall thickness. Further preferably, a stop means is provided in the spring means, which can preferably be formed as a rigid body, for example as a bolt or also a ball. The stop means is arranged with clearance in the spring means, whereby the spring means and the stop means can, for example, jointly define an annular gap. The width of this annular gap is preferably large enough for the spring means to have sufficient spring travel for its function. The spring travel is preferably greater than the tolerance to be compensated. On the other hand, the gap width is preferably so small that the spring means finds firm contact with the stop means before it is overloaded.

The stop means, i.e. a bolt for example, can be arranged stationary in the clamping plate. Alternatively, the bolt can be arranged movably, for example floating, in the clamping plate.

During clamping, the corresponding clamping bolts are subjected to a clamping force which comprises both an axial component, which pulls the clamping bolt into the opening, and a radial component, as a result of which the clamping bolt laterally resiliently contacts a point on the bore wall locally. By simultaneously actuating the tightening devices for all clamping bolts, it is ensured that the clamping bolts are tightened at the same time and the workpiece clamping device is thus positioned in the desired position.

Several such clamping plates can also be provided and arranged in a fixed spatial relationship to one another in a machine tool. Such an arrangement comprises at least two clamping plates according to the present disclosure with their own tightening devices. These have actuating rods coupled to one another or a common actuating rod. By this measure, the tightening devices of two or more clamping plates can be actuated together and simultaneously from one operating position.

If the tightening devices are actuated in series, incorrect positioning could otherwise occur. In any case, however, the concept according to the present disclosure saves operating effort and makes it possible to actuate several clamping plates from one side. This is particularly advantageous when mounting the clamping plates in enclosed working areas of machine tools where access to the clamping devices is restricted, for example, is only possible from one side.

In a preferred embodiment, the common actuating rod or the two actuating rods in contact with each other directly or with the aid of an intermediate piece are arranged in the clamping plates so as to be axially movable. The tightening and loosening of the tightening devices are then effected by axial movement of the actuating rod(s).

The actuating rods, which are in direct contact with each other at the end faces or with the interposition of an intermediate piece and are thus coupled in terms of movement, are preferably arranged in alignment with each other. In this way, the actuating movement of an actuating rod of one clamping plate is transmitted to the actuating rod of another clamping plate.

Each clamping plate preferably has a through opening in which the actuating rod is axially movably arranged. The through opening is preferably arranged parallel to a flat upper surface formed on the clamping plate. The clamping movement of the actuating rod can thus be introduced into the actuating rod from one of the side surfaces of the clamping plate.

Preferably, the through opening has an anchoring structure at its two ends, which is formed by an internal thread, for example. This is suitable for receiving and anchoring a spring means to preload the actuating rod in one direction, preferably in the release direction. At the other end of the through opening, an adjusting means, for example in the form of a screw, can be provided on the internal thread or other anchoring structure. By turning the screw, the actuating rod can be moved axially and thus tightening or loosening of the tightening device can be effected.

The actuating rod preferably has a wedge structure engages with at least one slide belonging to the tightening device. The wedge structure can be formed by an inclined surface formed on the actuating rod itself or also by an inclined surface provided on a wedge which is held on the actuating rod in an axially non-displaceable manner. The inclined surface is inclined against the longitudinal direction of the actuating rod.

The slide engages with at least one, preferably two clamping slides, each of which is assigned to one of the openings and arranged radially to it. In the clamping position, the clamping slide projects into the opening. In the release position, it is retracted from the opening. Preferably, a spring means is provided which preloads the clamping slide radially outwards with respect to the opening. The slide and the clamping slide preferably form a reduction gear, i.e. a stroke of the slide is translated into a stroke of the clamping slide that is at most as great as the stroke of the slide. Preferably, at least the actuating rod, the slide and the clamping slide form a reduction gear.

The slide and the clamping slides are preferably arranged in pockets of trapezoidal, rectangular or square cross-section, which are closed on one flat side of the clamping plate by one or more covers. This not only has manufacturing advantages, but also the additional benefit that the clamping plates can be provided with a continuous actuating rod which can be inserted into the aligned through-holes for assembly. The actuating rod can be inserted by first removing at least the slides from the clamping devices. After the actuating rod has been inserted, the slides can be inserted into their pockets and secured therein by fitting the cover.

BRIEF DESCRIPTION OF THE DRAWINGS

Advantageous embodiments of the invention are derived from the dependent claims, the description and the drawings. In the following preferred embodiments of the invention are described in detail based on the attached drawings. The drawings show:

DETAILED DESCRIPTION

Figure 1:
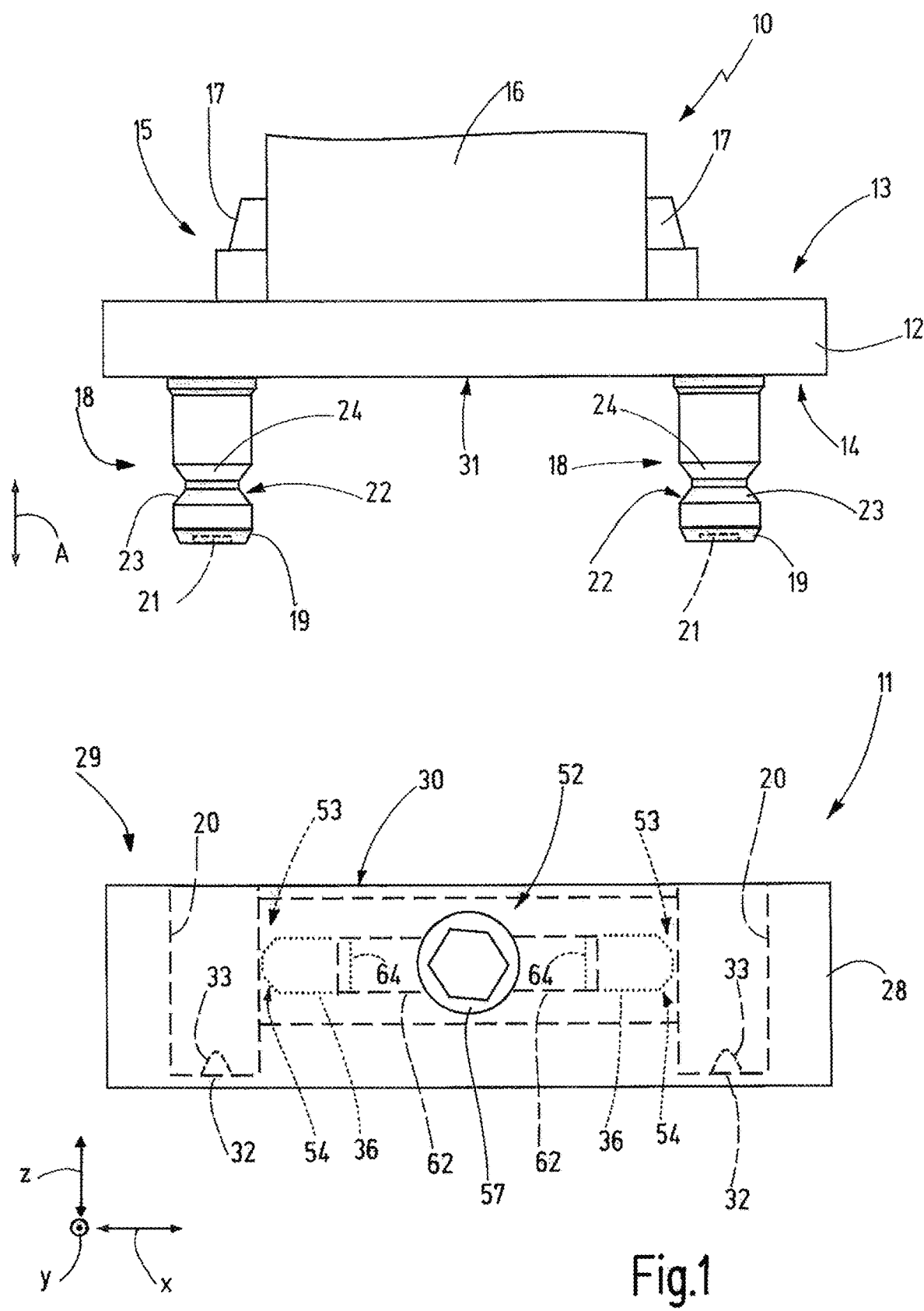
FIG. 1 a schematic side view of an embodiment of a workpiece holding device comprising a support plate having a holding device for a workpiece, as well as a clamping device for the support plate, FIG. 2 a sectional illustration of a part of the clamping device of FIG. 1 showing a clamping body and an assigned receptacle hole with a clamping bolt arranged therein, wherein the clamping body is in a release position, FIG. 3 the illustration of FIG. 2, wherein the clamping body is in a clamping position, FIG. 4 a schematic illustration of the clamping device of FIG. 1 in a section transverse through the receptacle holes, FIG. 5 a schematic illustration of the force components introduced from a clamping body into a clamping bolt in a first direction and a second direction, FIG. 6 a schematic illustration of the orientation of the longitudinal axes of the clamping bodies and the definition of multiple intersection points by the longitudinal axes of the clamping bodies and FIG. 7 a schematic illustration in part of the base body and the clamping device of FIGS. 1 and 4 in a cross-section through a guide channel for a clamping body.

FIG. 1 schematically shows an embodiment of a workpiece holding device 10 having a clamping device 11 and a support body 12. The support body 12 has a holding side 13 and an attachment side 14 facing away from the holding side 13. The support body 12 can be configured as support plate, wherein the holding side 13 and the attachment side 14 are formed by opposite sides of the support plate. The support body 12 comprises a holding device 15 for holding a workpiece 16 on the holding side 13. The holding device 15 can comprise clamping jaws 17, for example, in order to hold the workpiece 16 in a clamping manner on the support body 12.

On the attachment side 14 the support body 12 has multiple clamping bolts 18 that project from the support body 12. In the embodiment the clamping bolts 18 are orientated parallel to one another and extend in an axial direction A with reference to the support body 12. Each clamping bolt 18 can comprise at least one cylindrical section. At an end distant to the support body 12 each clamping bolt 18 has a chamfer or a conically tapering end section 19. Thereby the introduction of the clamping bolt 18 in an assigned receptacle hole 20 of the clamping device 11 is simplified. On the free end each clamping bolt 18 can have a face cavity 21 in the face.

In addition each clamping bolt 18 comprises at least one impingement surface 22. The impingement surface 22 extends obliquely inclined to the axial direction A. In the illustrated embodiment each clamping bolt 18 has exactly one impingement surface 22 that is formed by the outer surface of a conical section 23 of clamping bolt 18. The conical section 23 expands in axial direction A away from the support body 12 toward the free end of clamping bolt 18. The conical section 23 is arranged with distance to the support body 12 and the end section 19 according to the example. A tapering section 24 of clamping bolt 18 can be provided between conical section 23 and support body 12. The tapering section 24 can also be formed by the outer surface of a cone. A cylindrical section can be provided between tapering section 24 and conical section 23. As an alternative, tapering section 24 and conical section 23 can also directly transition into one another. Thereby a constriction is formed on clamping bolt 18 with distance from end section 19 and with distance from support body 12.

The clamping device 11 has a base body 28. The base body 28 has an abutment surface 30 on a clamping side 29. The abutment surface 30 is configured to abut against a counter abutment surface 31 provided on the support body 12, if support body 12 is arranged or clamped by means of the clamping bolts 18 on the clamping device 11 or base body 28. Preferably the abutment surface 30 extends in a plane that is spanned by a first direction x and a second direction y. The first direction x and second direction y are related to a coordinate system of clamping device 11 or base body 28. In this coordinate system the third direction z is orientated orthogonal to the first direction x and second direction y. If the connection between support body 12 and clamping device 11 is established, clamping bolts 18 approximately extend in third direction z.

Counter abutment surface 31 extends preferably in a plane orientated orthogonal to axial direction A. Abutment surface 30 and counter abutment surface 31 are configured for two-dimensional abutment against one another. As an alternative to this configuration it is also possible to configure base body 28 and/or support body 12 in a manner such that instead of a two-dimensional abutment, a line-like or point-shaped contact is formed on several locations and for example at least one or exactly three contact locations arranged with distance to one another, if the connection between support body 12 and clamping device 11 is established. The abutment surface 30 or the counter abutment surface 31 could comprise, for example, three convex, particularly dome-shaped elevations against which the respective other surface (i.e. counter abutment surface 31 or abutment surface 30) abuts in a point-shaped manner.

For each present clamping bolt 18 one assigned receptacle hole 20 is provided in the base body 28 that is open toward the clamping side 29. In the embodiment the receptacle holes 20 open out into the abutment surface 30. The receptacle holes 20 are configured as blind holes in the embodiment and are closed on the bottom side of base body 28 opposite the clamping side 29 by means of one hole bottom 32 respectively. As an option, an elastically deformable element 33 is arranged on the hole bottom 32 projecting into the receptacle hole and applying a force in the third direction z onto an assigned clamping bolt 18, if clamping bolt 18 is completely arranged in receptacle hole 20 and counter abutment surface 31 abuts against abutment surface 30. The force in the third direction z can be created by elastical deformation of element 33. The elastically deformable element 33 can thereby engage into the face cavity 21 of the assigned clamping bolt 18. Due to this force, release of the clamping connection between support body 12 and clamping device 11 can be simplified.

Figure 4:
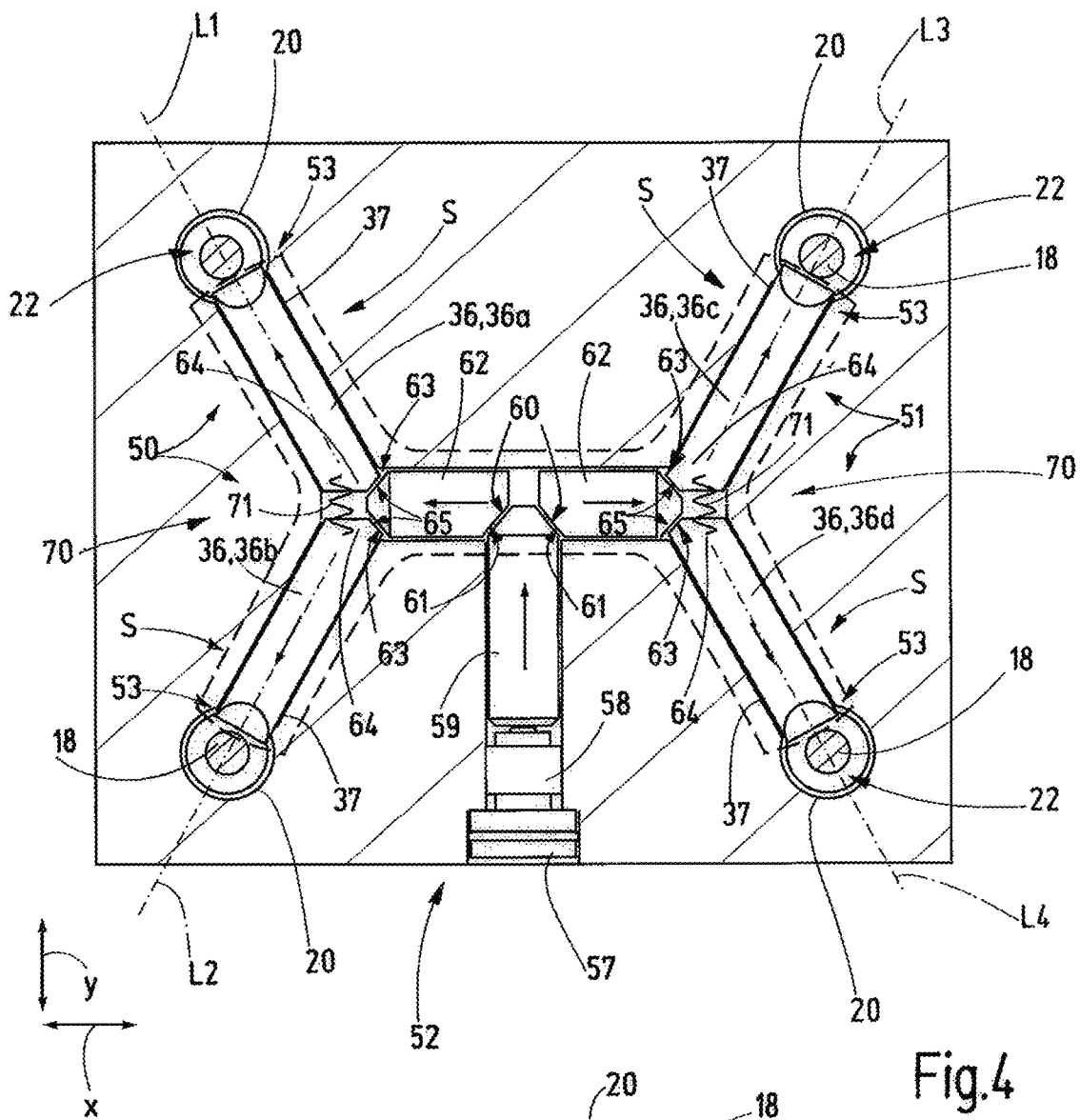
Figure 6:
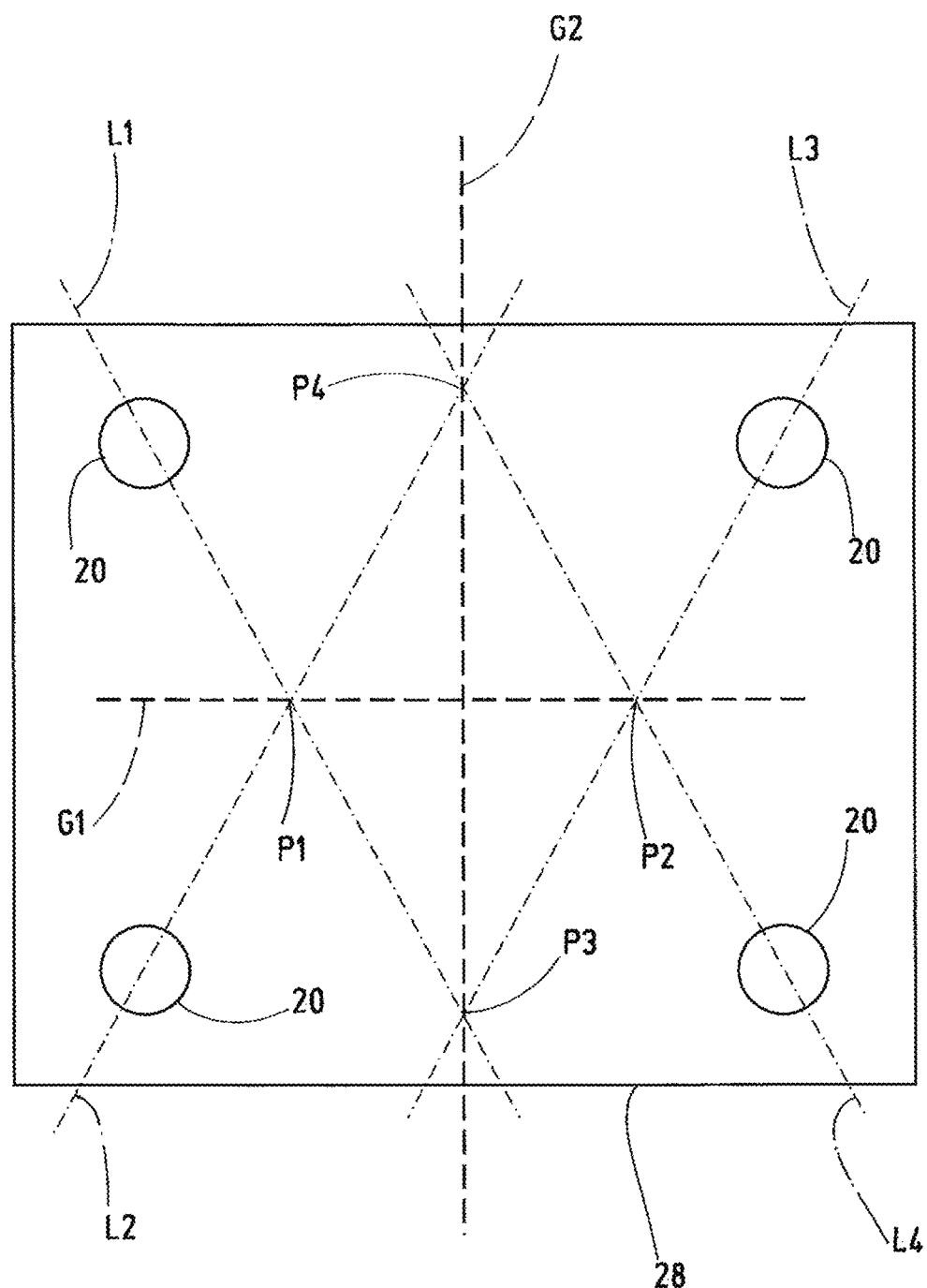

In the embodiment clamping device 11 has four receptacle holes 20. The receptacle holes 20 form corner points of a rectangle according to the example (FIGS. 4 and 6). Accordingly, four clamping bolts 18 are provided on support body 12, the arrangement and distance of which corresponds to the arrangement and distance of the receptacle holes 20.

Clamping device 11 has multiple clamping bodies 36 that are arranged in a linearly movable manner on and according to the example, in base body 28. Each clamping body 36 is movably supported in a guided manner in a guide channel 37. The guide channels 37 are introduced into base body 28, preferably by milling. Each guide channel 37 for a clamping body 36 opens out into a receptacle hole 20.

Figure 7:
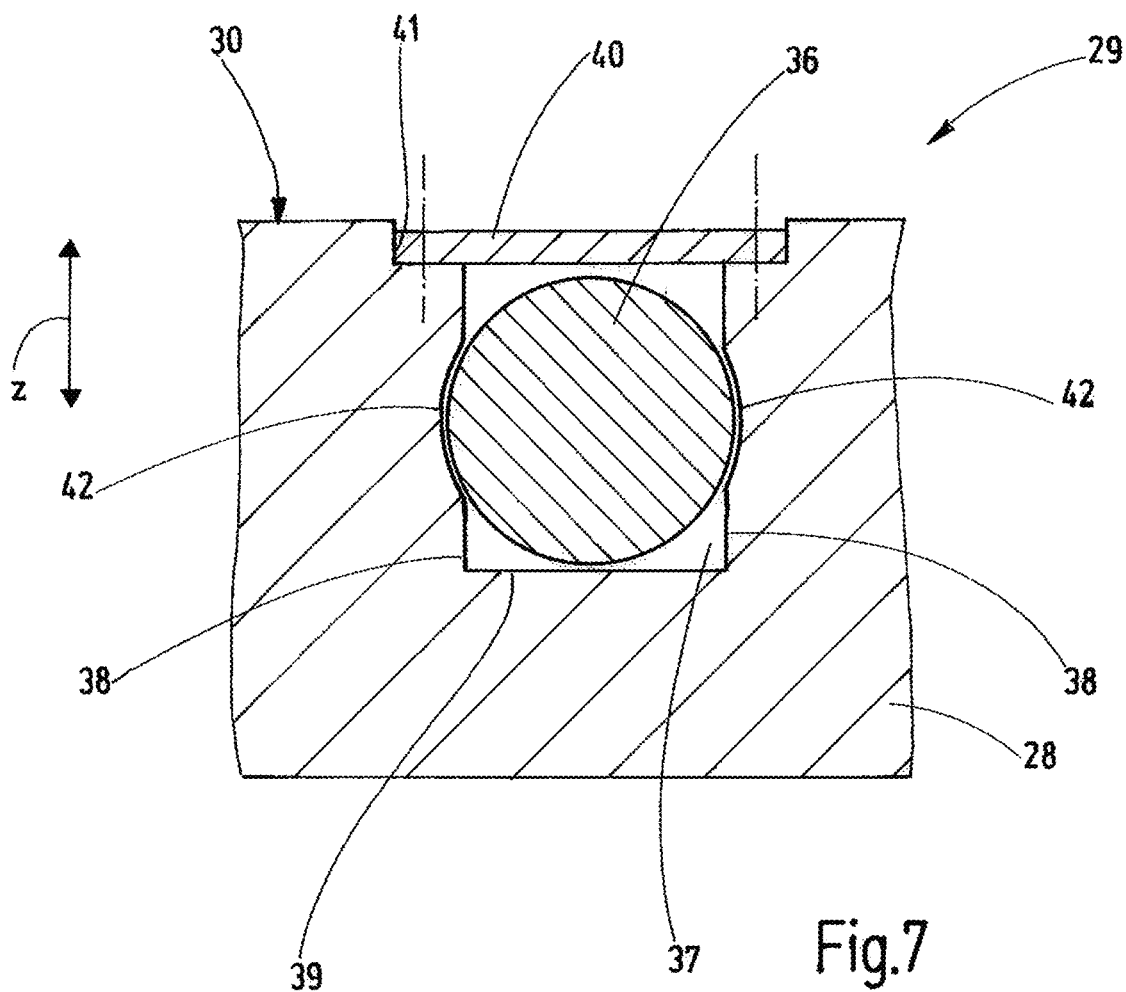

In the embodiment the guide channels 37 are groove-shaped and have two opposite channel walls 38 that are connected with one another via a channel bottom 39 (FIG. 7). On the side opposite the channel bottom 39 the guide channel 37 is open to the clamping side 29 and according to the example, closed by means of a cover 40. Cover 40 is arranged such that it does not project beyond the plane in third direction z in which the abutment surface 30 or counter abutment surface 31 extends, if the connection with support body 12 is established. Preferably the outer surface of cover 40 accessible on the clamping side 29 is arranged with distance to abutment surface 30. As an alternative to this, outer surface of cover 40 accessible from the clamping side 29 can form a section of the abutment surface 30. Cover 40 is preferably arranged in a cover holding cavity 41 adjoining the clamping side 29. The cover holding cavity 41 forms a depression or cavity in base body 28 and comprises support surfaces for cover 40 in order to be able to attach cover 40 on base body 28, for example by means of a screw connection.

Each channel wall 38 has a guide wall section 42. Outside of the respective guide wall section 42 the channel wall 38 extends in a plane, according to the example, that is orientated parallel to the third direction z in the embodiment. Preferably a contact between clamping body 36 and channel wall 38 does not exist outside of the respective guide wall section 42. Preferably no contact exists between clamping body 36 and channel bottom 39 and/or cover 40 outside of guide wall sections 42.

The guide wall sections 42 are configured in a trough-shaped manner according to the embodiment. Accordingly, the areas of the guided clamping body 36 in abutment with the guide wall sections 42 are curved in a convex manner. With view onto channel wall 38, each guide wall section 42 can be curved in a concave manner with a radius corresponding to the outer radius of a cylindrical or in part cylindrical section of clamping body 36. By means of the two opposite guide wall sections 42, clamping body 36 can thus be movably arranged in a guided manner inside guide channel 37 in the guide wall sections 42.

The guide wall sections 42 are preferably directly formed by an area or the material of base body 28.

It is noted here that the arrangement of clamping body 36 in guide channels 37, as described above based on FIG. 7, can be realized independent from other configuration features of clamping device 11.

In the embodiment illustrated here exactly one clamping body 36 is assigned to each present receptacle hole 20 (FIG. 4). The provided clamping body 36 form multiple clamping body groups, wherein in the embodiment a first clamping body group 50 and a second clamping body group 51 are present. Each clamping body group 50, 51 has exactly two clamping bodies 36 in the embodiment. A first clamping body 36a and a second clamping body 36b are part of first clamping body group 50 and a third clamping body 36c and a fourth clamping body 36d are part of the second clamping body group 51. First clamping body 36a has a first longitudinal axis L1 and is movably arranged in the assigned guide channel 37 along its first longitudinal axis L1. Second clamping body 36b has a second longitudinal axis L2 and is movably supported in the assigned guide channel 37 along the second longitudinal axis L2. Third clamping body 36c has a third longitudinal axis L3 and is movably supported in the assigned guide channel 37 along the third longitudinal axis L3. Fourth clamping body 36d has a fourth longitudinal axis L4 and is movably supported in the assigned guide channel 37 along the fourth longitudinal axis L4. If in the following longitudinal axis L of a clamping body 36 is mentioned, this means the respective longitudinal axis L1 or L2 or L3 or L4 of first or second or third or fourth clamping body.

Figure 2:
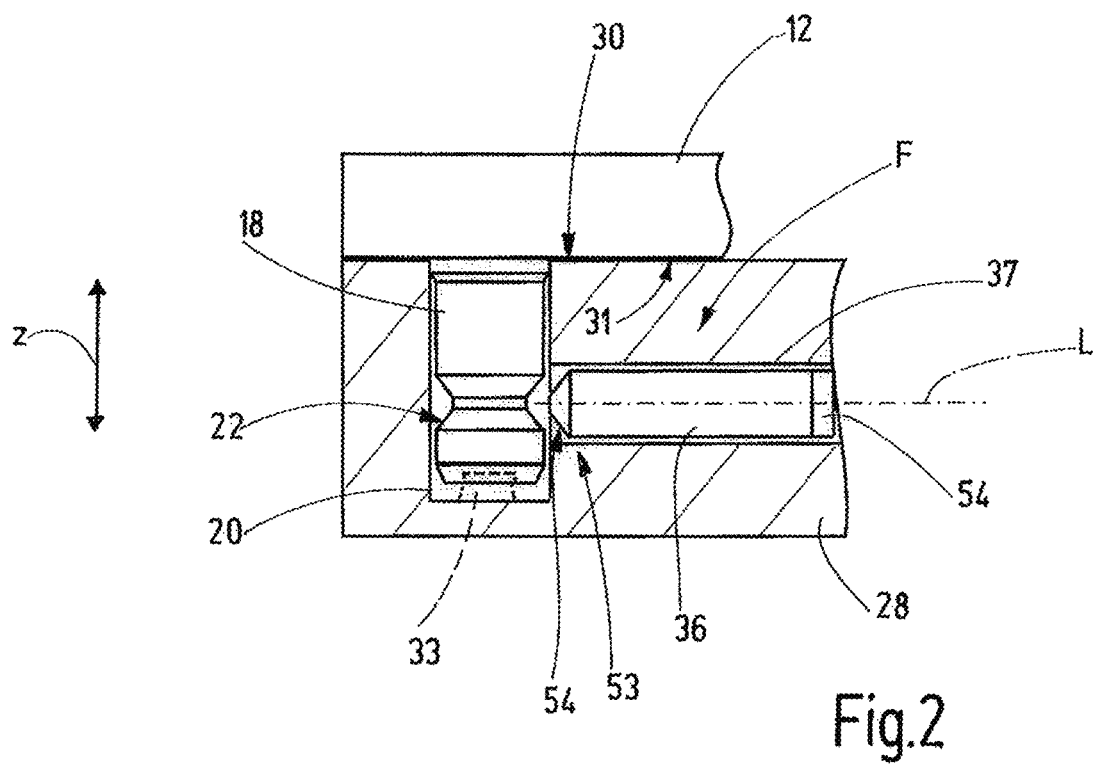

Each clamping body 36 can be moved between a release position F (FIGS. 1 and 2) and a clamping position S (FIGS. 3-5) by means of an operating device 52 of clamping device 11. In the clamping position S the clamping body 36 engages in the assigned receptacle hole 20 and can act on a clamping bolt 18 arranged there in order to immovably clamp support body 12 with workpiece 16 on base body 28 of clamping device 11. For this each clamping body 36 has a clamping end 53 assigned to the receptacle hole 20 in the embodiment. The clamping body 36 has a clamping surface 54 extending obliquely to the longitudinal axis L of clamping body 36 in the clamping end 53. The clamping surface 54 is in addition inclined with regard to a third direction z and extends preferably parallel to the second direction y. Clamping surface 54 can have approximately the same inclination with regard to third direction z as impingement surface 22 with regard to axial direction A. In doing so, a two-dimensional or line-shaped contact can be established between clamping surface 54 of clamping body 36 and impingement surface 22 of clamping bolt 18.

Figure 3:
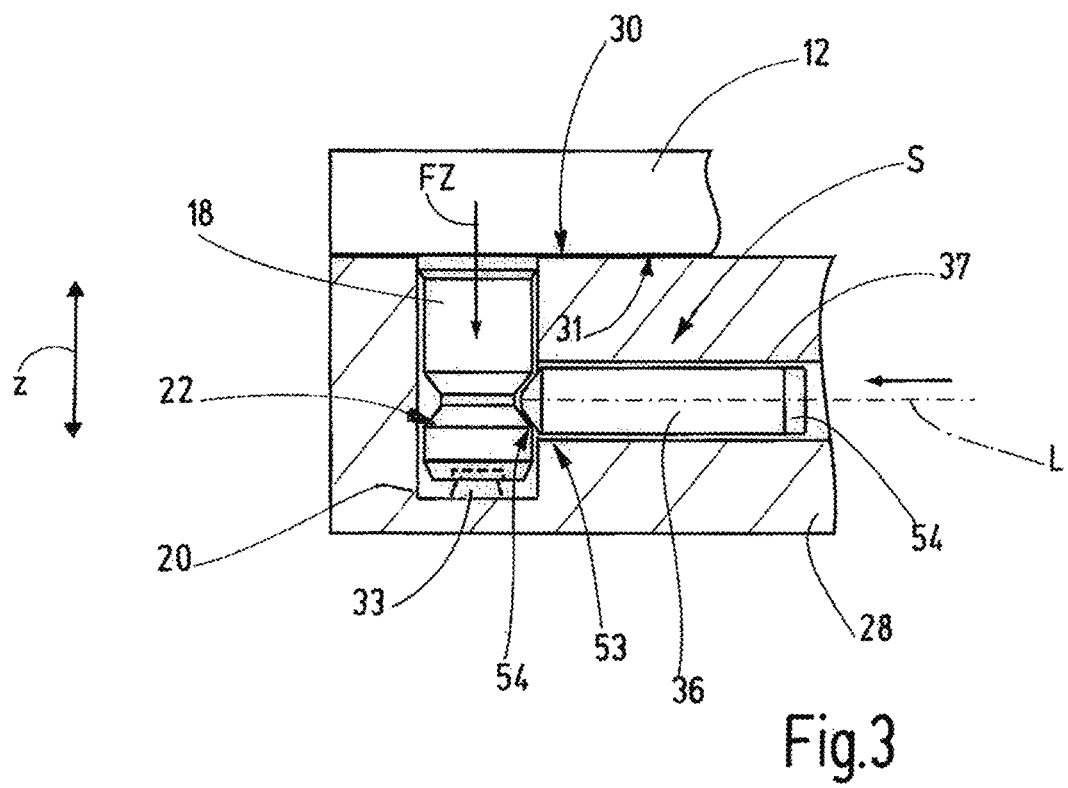

As apparent from FIG. 3, by means of the surfaces 22, 54 orientated obliquely to third direction z, a traction force FZ can be created on clamping bolt 18 that in turn provides for pressing of abutment surface 30 and counter abutment surface 31 against one another. Therefore, a very precise positioning of support body 12 on base body 28 of clamping device 11 in this third direction z is guaranteed.

Figure 5:
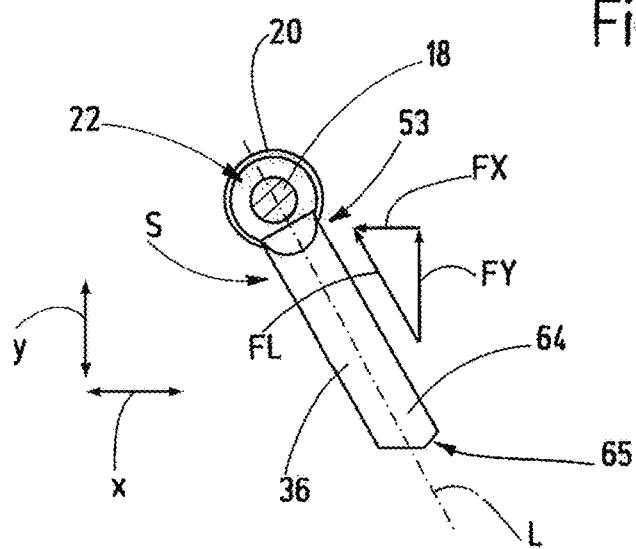

It is also apparent from FIGS. 4 and 5 that clamping body 36 in addition applies a longitudinal force FL onto the assigned clamping bolt 18 in the clamping position S that is orientated along or parallel to the respective longitudinal axis L. As illustrated in FIG. 4, all of the longitudinal axes L, i.e. first longitudinal axis L1, second longitudinal axis L2, third longitudinal axis L3 and fourth longitudinal axis L4 extend obliquely inclined with regard to first direction x and second direction y respectively. In doing so, longitudinal force FL comprises a first force component FX in first direction x and a second force component FY in second direction y (FIG. 5). Thus, each clamping bolt 18 is subject to a traction force FZ in third direction z, as well as a first force component FX in first direction x and a second force component FY in second direction y, due to the engagement of a clamping body 36 being in clamping position S. Clamping bolts 18 are thus urged away from each other in first direction x, as well as in second direction y, if the clamping bodies 36 are in the clamping position S. Thereby a very accurate positioning of support body 12 with workpiece 16 in first direction x and second direction y on base body 28 of clamping device 11 is guaranteed.

The positioning is further improved and more accurate in that the longitudinal axes L of clamping bodies 36 define multiple points of intersection arranged with distance from one another, as schematically illustrated in FIG. 6. First longitudinal axis L1 of clamping body 36a and second longitudinal axis L2 of clamping body 36b, that both belong to first clamping body group 50, form a first intersection point P1. Third longitudinal axis L3 of third clamping body 36c and fourth longitudinal axis L4 of fourth clamping body 36d that both belong to the second clamping body group 51 define a second intersection point P2. In the embodiment described here the first intersection point P1 and the second intersection point P2 are arranged on a common first straight line G1 extending parallel to the first direction x.

In the embodiment first longitudinal axis L1 of first clamping body 36a and third longitudinal axis L3 of third clamping body 36c define a third intersection point P3. Second longitudinal axis L2 of second clamping body 36b and fourth longitudinal axis L4 of fourth clamping body 36d define a fourth intersection point P4. Third intersection point P3 and fourth intersection point P4 are thus defined by longitudinal axes L1 and L3 or L2 and L4 that are part of clamping bodies 36a and 36c or 36b and 36d of different clamping body groups 50 or 51. According to the example, third intersection point P3 and fourth intersection point P4 are arranged on a common second straight line G2 extending in the second direction y.

In the embodiment the four intersection points P1 to P4 form the corner points of a rhombus in a plane parallel to the abutment surface 30. The distance between the first intersection point P1 and the second intersection point P2 is preferably different from the distance between the third intersection point P3 and fourth intersection point P4.

In the embodiment the two straight lines G1 and G2 intersect in a center point that also is the intersection point of the straight lines that connect the receptacle holes 20.

Due to the definition of multiple intersection points P1 to P4 by longitudinal axes L1 to L4 of clamping bodies 36, also a rotational degree of freedom around an axis extending in third direction z is very well eliminated and the positioning accuracy of support body 12 relative to base body 28 is further increased.

The arrangement and orientation of the longitudinal axes L of clamping body 36 and the definition of intersection points P1 to P4 can be realized independent from other configurations of a clamping device 11 or workpiece holding device 10.

An embodiment of the operating device 52 is illustrated in FIG. 4. The operating device 52 has preferably one single drive source in order to switch all of the clamping bodies 36 between the release position F and the clamping position S. Thus, all of the clamping bodies 36 are in the release position F, if one of the clamping bodies 36 is in the release position F and vice versa all of the clamping bodies 36 are in the clamping position S, if one of the clamping bodies 36 is in the clamping position S. In the embodiment an operating screw 57 serves as a drive source that is rotatably supported in a nut 58. The nut 58 is seated in a torque-proof manner on base body 28. By rotation of the operating screw 57, the operating screw 57 can thus be displaced along its rotation axis that extends in second direction y in the embodiment. By means of the operating screw 57, a main body 59 being in abutment therewith can be displaced linearly parallel to its extension and according to the example, in second direction y. Thereby an abutment contact exists between main body 59 and operating screw 57.

The operating screw 57 can be rotated by means of a tool, for example. The tool can be handled by an operating person. The tool can also be provided on a robot arm or another machine device.

On its end opposite the operating screw 57 the main body 59 has at least one and in the embodiment two main body surfaces 60 orientated obliquely to the second direction y and obliquely to the first direction x. The main body tapers in a wedge-shaped manner toward its end due to the two main body surfaces. The main body surfaces 60 are respectively configured as abutment surface for one operating body end surface 61 of an operating body 62. According to the example, the inclination and orientation of the operating body end surface 61 of a respective operating body 62 is orientated parallel to the main body surface 60 against which the operating body end surface 61 abuts. Each operating body end surface 61 is thus orientated obliquely to the first direction x and obliquely to the second direction y. The main body surfaces 60 and the operating body end surfaces 61 are preferably planar surfaces and extend parallel to the third direction z according to the example.

The operating device 52 comprises one operating body 62 for each present clamping body group 50, 51. Thus, in the embodiment two separate operating bodies 62 are provided. According to the example, each operating body 62 is linearly displaceably supported. The two operating bodies 62 are linearly displaceably supported in first direction x in the embodiment. As particularly apparent from FIG. 4, the operating bodies 62 can be arranged along a common axis. On their one end they comprise the operating body end surface 61 and on an opposite front end with view in first direction x they comprise at least one slant 63. For each clamping body 36 of the assigned clamping body group 50, 51 one slant 63 is provided. Thus, each operating body 62 has two slants 63 in the embodiment. The slants 63 of an operating body 62 are orientated obliquely to the first direction x and the second direction y respectively and are preferably configured as planar surfaces that extend parallel to the third direction z. Due to the two slants 63, the operating body 62 tapers in a wedge-shaped manner toward the free end that is assigned to the clamping bodies 36.

Each clamping body 36 has a clamping body end surface 65 on its operating end 64 opposite the clamping end 53 configured for abutment with the assigned slant 63. The clamping body end surface 65 is respectively inclined with regard to the first direction x and inclined with regard to the second direction y and is according to the example, orientated parallel to the third direction z and corresponds in its inclination and orientation to the assigned slant 63.

The operating device 52 thus forms a wedge surface gear between main body 59 and operating body 62, as well as between operating bodies 62 and clamping bodies 36. The connection between main body 59 and operating body 62 is exclusively an abutment contact and cannot transmit traction forces. The connection between the operating body 62 and the clamping bodies 36 is an abutment contact and cannot transmit traction forces.

The operating device 52 is configured without fluidic force transmission. It does not contain fluid components such as pistons or cylinders. The operating device 52 operates exclusively mechanically according to the example.

The clamping device 11 has in addition a biasing arrangement 70. The biasing arrangement 70 is configured to bias or urge clamping bodies 36 in their release position F. For this, clamping bodies 36 can be subject to an elastical force that pulls or pushes clamping bodies 36 along their respective longitudinal axis L away from the assigned receptacle hole 20 toward the release position F.

In the embodiment illustrated here one biasing element 71 of biasing arrangement 70 is assigned to each clamping body group 50, 51. Two biasing elements 71 are thus sufficient. In the embodiment the biasing elements 71 are not directly supported on base body 28, but connect the clamping bodies 36 of a common clamping body group 50 or 51 directly. A first biasing element 71 connects first clamping body 36a with second clamping body 36b and a second biasing element 71 connects third clamping body 36c with fourth clamping body 36d. The biasing elements 71 effect a traction force and are attached to the clamping bodies 36 in the area of the operating end. Due to the traction force of biasing elements 71, the clamping body end surfaces 65 of clamping bodies 36 of a common clamping body group 50 or 51 are urged against the respectively assigned slant 63 of operating body 62 that is assigned to the clamping body group 50 or 51. This in turn results in that the operating body end surfaces 61 of operating bodies 62 are urged against the respectively assigned main body surface 60 of main body 59 in order to support the force acting on the operating bodies 62 by means of the biasing elements 71. Main body 59 supports the impinging force on operating screw 57. Operating screw 57 supports the force on base body 28 via nut 58. The thread connection between operating screw 57 and nut 58 is self-locking such that the force applied to the operating screw 57 in second direction y cannot result in that the operating screw 57 moves in second direction y. Between main body 59 and operating body 62 on one hand and between operating body 62 and clamping bodies 36 on the other hand, an abutment contact is continuously established in the embodiment.

As an alternative to the embodiment illustrated in FIG. 4, a separate biasing element 71 could be assigned to each clamping body 36 that is supported on base body 28. In the illustrated embodiment the biasing element 71 can be tension springs, e.g. helical springs, that are arranged in cavities of clamping bodies 36 that are open toward the respective operating end 64. The cavities are not illustrated for sake of clarity in FIG. 4.

The operating device 52 operates as follows:

In a retracted position of main body 59 the operating bodies 62 are sufficiently close adjacent to one another in first direction x that the clamping bodies 36 being in abutment therewith are urged in the release position F by means of biasing arrangement 70 and release the receptacle holes 20 for insertion of clamping bolts 18. After arrangement of clamping bolts 18 in the receptacle holes 20, main body 59 can be moved in second direction y by operating screw 57 and displace the two operating bodies 62 from each other. This in turn results in that the clamping bodies 36 being in abutment against slants 63 are moved along their respective longitudinal axis in the assigned receptacle hole 20 and into the clamping position S. Due to the inclination of screw thread between operating screw 57 and nut 58 the operating device 52 is configured in a self-locking manner. Independent from a force acting on the linearly displaceably supported main body 59 in second direction y, the operating screw 57 remains in its axial position relative to nut 58 and thus maintains clamping position S. This is because an annulation of this clamping position is mechanically blocked by means of the mechanical abutment between clamping bodies 36 against operating bodies 62 and the operating bodies 62 against main body 59.

Release of the clamping connection is carried out in that operating screw 57 is rotated in release direction, whereby main body 59 can be moved in second direction y, such that approaching of the two operating bodies 62 in first direction x is possible. Main body 59 is at least partly removed out of the interstice between the two operating bodies 62 so-to-speak. In doing so, operating bodies 62 are moved in first direction x toward one another, which is effectuated by the force of the biasing arrangement 70 and according to the example, the two biasing elements 71. This in turn results in that each clamping body 36 is moved away along its respective longitudinal axis L from the assigned receptacle hole 20 and can take its release position F.

In the release position F clamping bolts 18 are not held on base body 28 by the clamping bodies 36. The optionally provided elastically deformable elements 33 have the effect that clamping bolts 18 are at least slightly urged out of the receptacle holes 20 in order to simplify removal of support body 12 from clamping device 11.

With regard to FIG. 7, the guide of clamping bodies 36 in guide channels 37 has been explained. In addition or as an alternative to this guidance of clamping bodies 36, also the at least one operating body 62 and/or the main body 59 can be guided in this manner. It is therefore also possible to provide a guide channel 37 for each present operating body 62 or for main body 59 that is provided according to the example, as it has been described and explained for clamping body or clamping bodies 36 based on FIG. 7.

The invention refers to a clamping device 11 and is configured for releasably clamping a support body 12 on which a workpiece 16 can be arranged. The clamping device 11 has a base body 28 with receptacle holes 20 for location of one clamping bolt 18 of support body 12 respectively. Each clamping body 36 is linearly movable along its longitudinal axis L between a clamping position S and a release position F. The movement from the release position F into the clamping position S and/or vice versa from the clamping position S into the release position F can be carried out by means of an operating device 52. Each clamping body 36 has a clamping end 53 that projects into an assigned receptacle hole 20 in the clamping position S. The longitudinal axes of clamping bodies 36 define multiple points of intersection in a common projection plane parallel to which the longitudinal axes L extend. In a preferred embodiment at least three or four points of intersections are defined. Particularly four clamping bodies 36 with respectively one longitudinal axis L can be provided, wherein four points of intersections are defined in that two of the provided longitudinal axes L1, L2 or L3, L4 or L1, L3 or L2, L4 intersect in each case.

Referring now to FIGS. 8A-12 an embodiment of the present disclosure is illustrated.

Figure 8A:
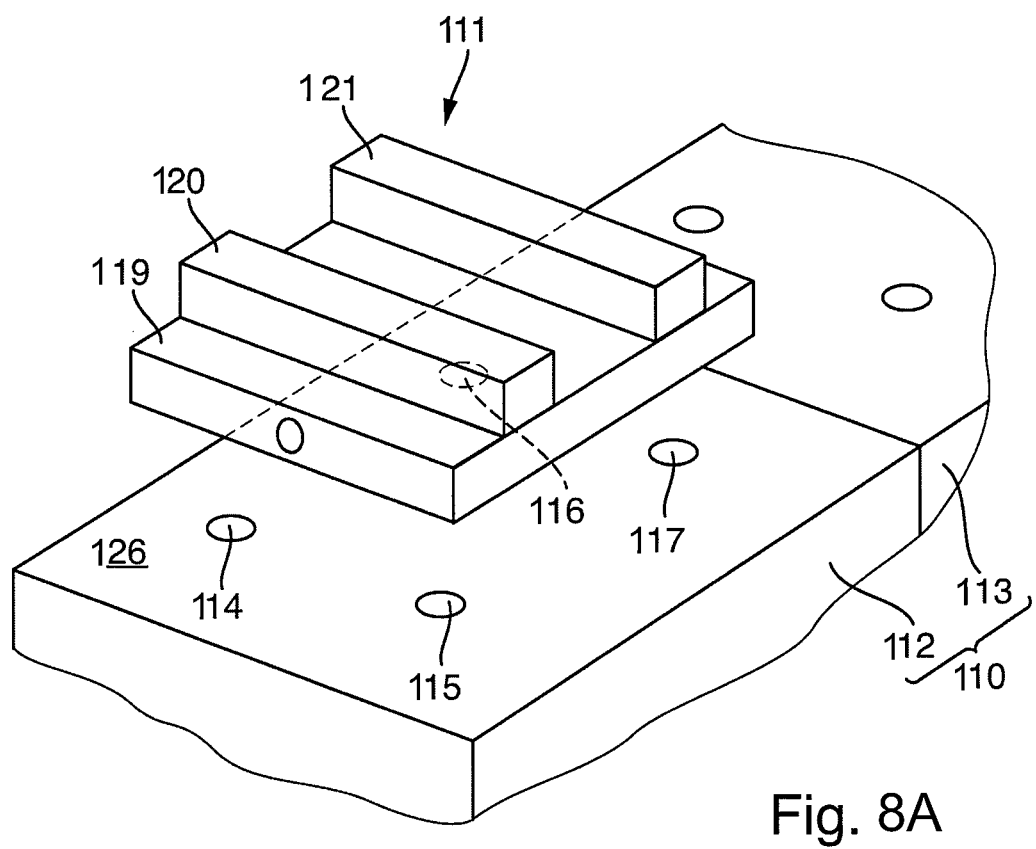
FIG. 8A illustrates a simplified perspective view of a workpiece clamping device and an associated clamping plate.

FIG. 8A illustrates a device 110 for holding a workpiece clamping device 111 or for directly holding a workpiece. The device 110 comprises at least one clamping plate 112, which can be arranged in a machine tool, for example, in order to support the workpiece clamping device 111 in a predetermined nominal position. Optionally, one or more further clamping plates 113, 123, 123' (FIG. 11, FIG. 12) may be provided. The clamping plates 112, 113, 123, 123' can be of substantially the same design as one another, so that the following description of the clamping plate 112 applies correspondingly to the clamping plate 113 and in a transferred manner also to the multi-nested clamping plates 123, 23'.

Figure 9:
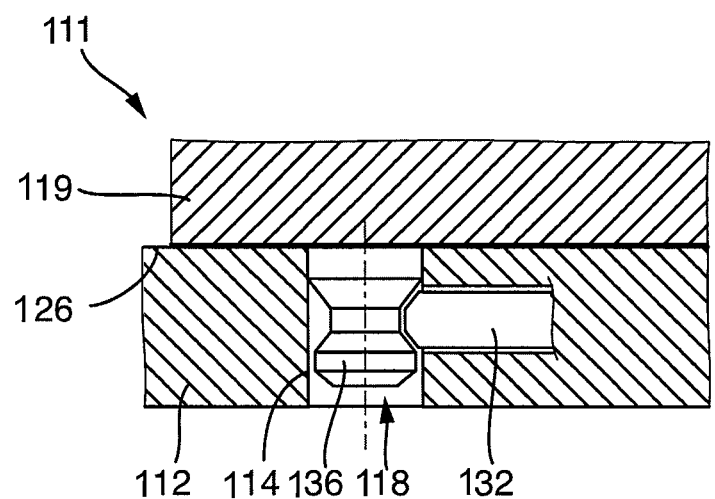
FIG. 9 illustrates a vertical section of the workpiece clamping device and the clamping plate.

The clamping plate 112 has several, for example four, openings 114, 115, 116, 117, which serve to receive clamping bolts 118 of the workpiece clamping device 111 or a workpiece. FIG. 9 shows an example of such a clamping bolt 118 engaging in the opening 114. Several clamping bolts project away from the lower surface of the guide body 119, the arrangement of which corresponds to the arrangement of the openings 114 to 117.

The workpiece clamping device 111 has a guide body 119 on which at least one or two clamping jaws 120, 121 are movably mounted in order to grip and firmly hold a workpiece between them.

Figure 10:
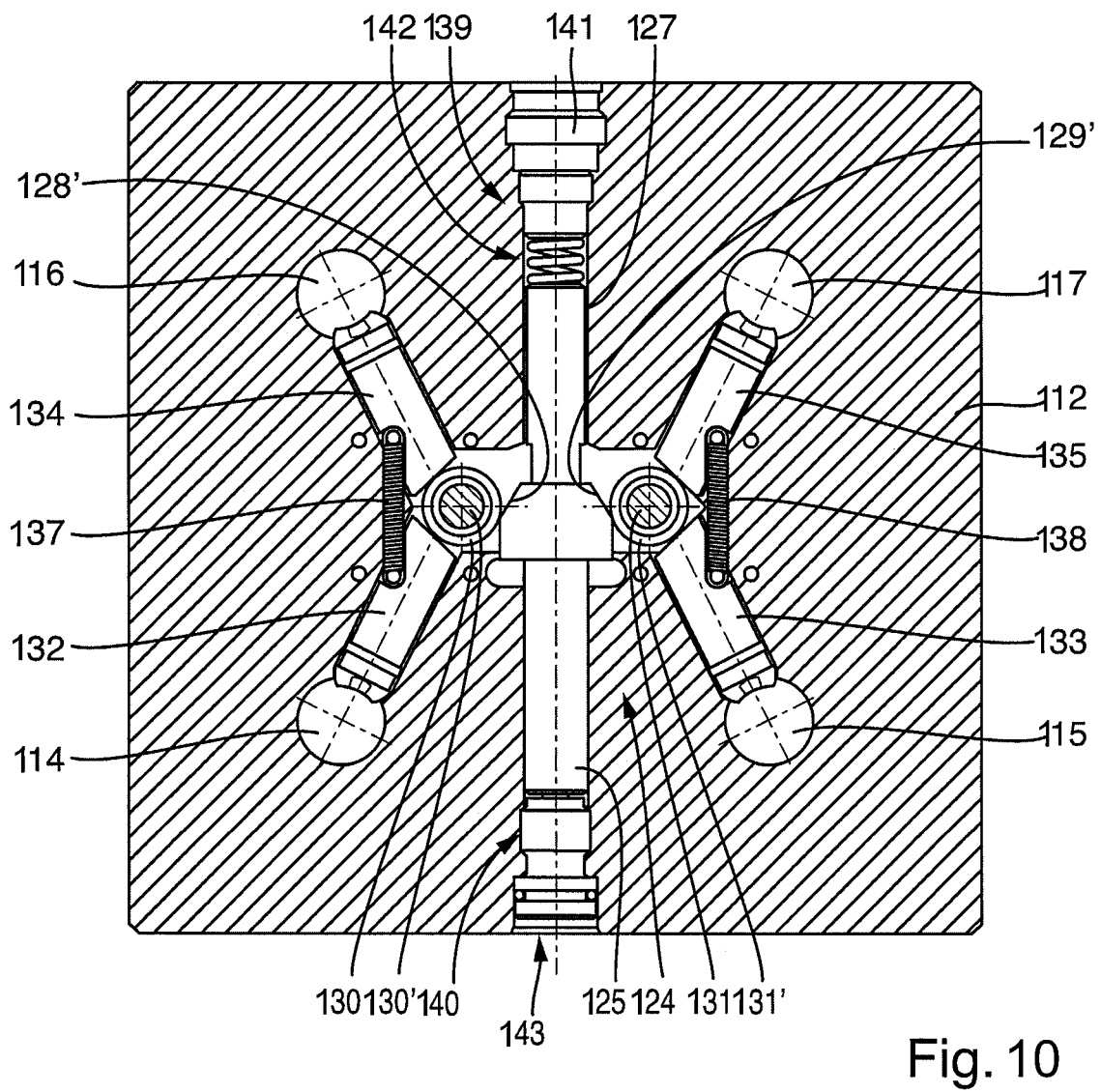
FIG. 10 illustrates a tightening device of the clamping plates shown in FIGS. 1 and 2 in a schematic representation.
Figure 11:
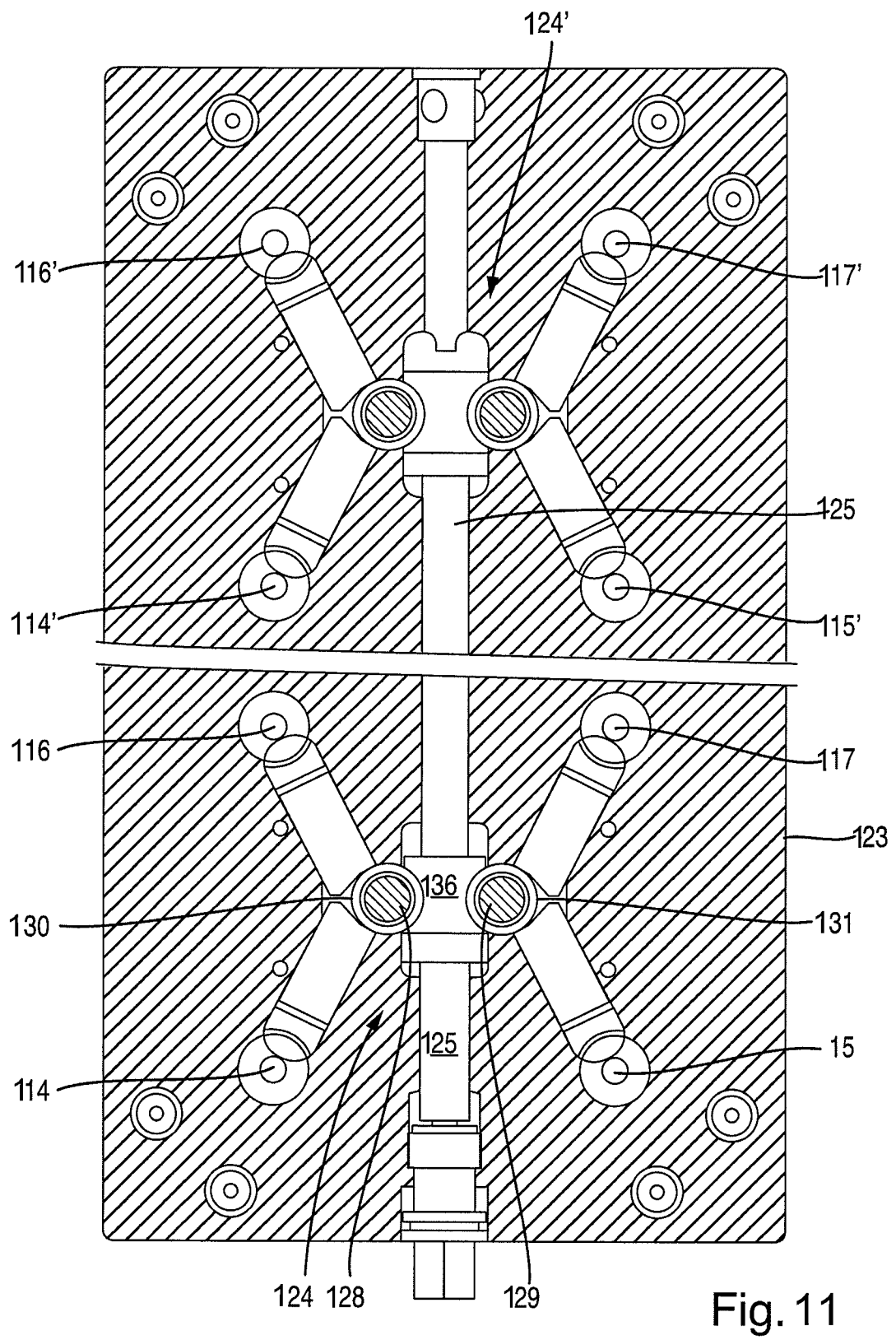
FIG. 11 illustrates a clamping plate with several opening groups.
Figure 12:
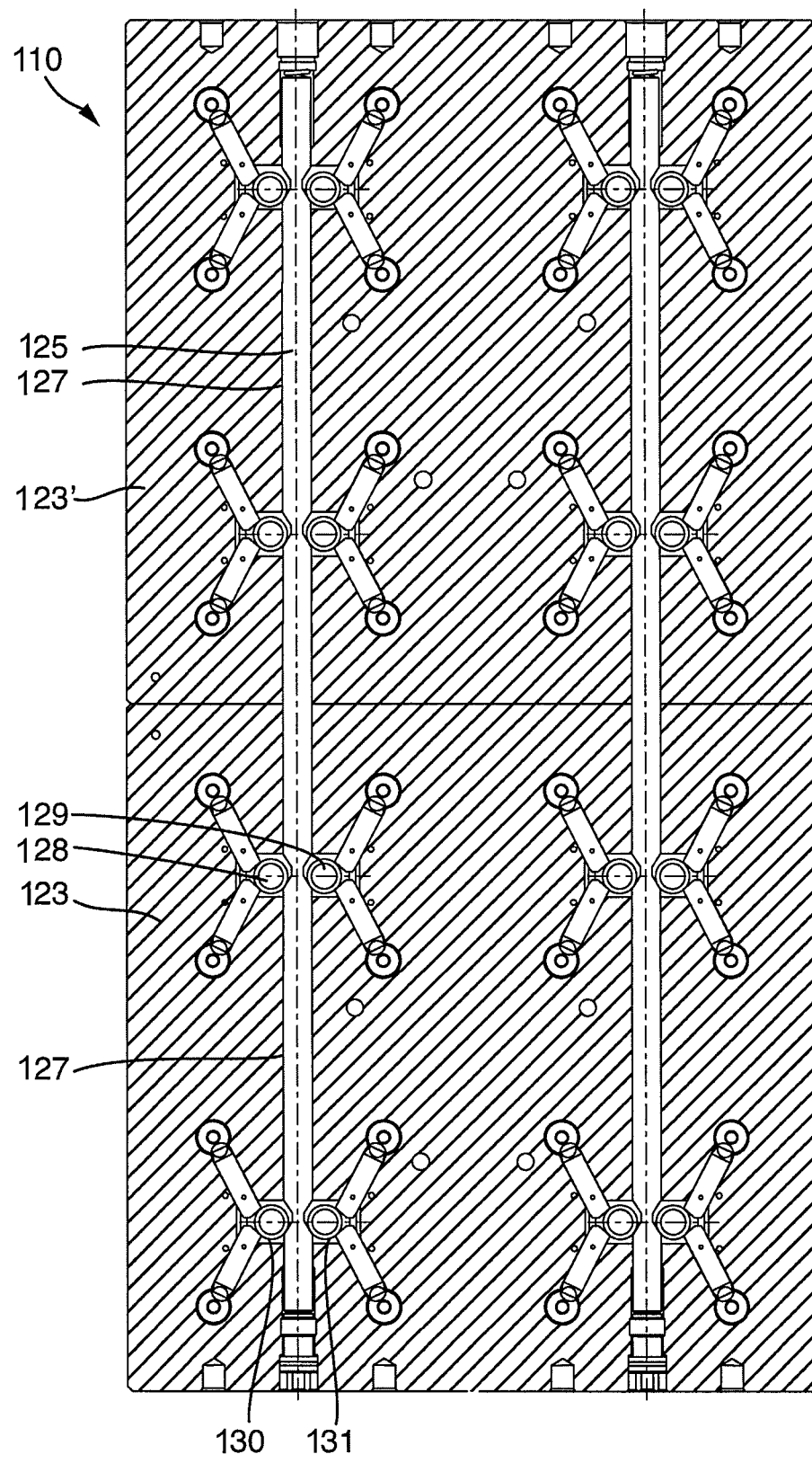
FIG. 12 illustrates an arrangement consisting of several clamping plates, each with several opening groups.

FIG. 10 illustrates the clamping plate 112 and its tightening device 124. This comprises an actuating rod 125 arranged axially displaceably in a through bore 127 passing through the clamping plate 112 parallel to its upper surface 126. The actuating rod 125 is, for example, a round rod which, for actuating the tightening device, has two opposing lateral recesses or which supports a wedge 136 with two inclined surfaces 128, 129. Alternatively, the inclined surfaces 128, 129 may be formed directly on the actuating rod 125, as illustrated in FIG. 12. The inclined surfaces can be formed as flat wedge surfaces. However, it is also possible to form the inclined surfaces 128, 129 as curved surfaces, as can be seen from FIGS. 11 and 12.

The wedge 136 is operatively connected to clamping slides 132, 133, 134, 135 via spring means 130, 131 to urge them apart. The spring means 131, 132 are arranged on both sides of the wedge 136 and are in contact with its inclined surfaces 128, 129 on the one hand and with end surfaces of the clamping slides 131-135 on the other. The spring means 130, 131 are movable in pockets of the clamping plate 112 transversely to the actuating rod 125.

The spring means 130, 131 are preferably of identical design. In the above example, they are formed by hollow bodies, e.g. in the form of circular rings of hollow cylindrical shape which spring in the radial direction. They are preferably made of steel and can spring in the radial direction by a few hundredths of a millimeter without being damaged. A somewhat larger spring stroke of one or a few 10ths of a millimeter may also be provided. The spring means 130, 131 may have a cylindrical outer surface. Alternatively, if the wedge 136 is formed as a rotary member, they may have a double-curved outer surface.

Each annular spring means 130, 131 encloses an inner space in which a stop means 130', 131' is arranged. These stop means are formed, for example, by cylindrical bolts which are arranged in the respective spring means 130, 131 with a clearance of preferably a few tenths of a millimeter. The stop means 130', 131' can be arranged in the clamping plate 112 in a fixed position or also movable in radial direction in order not to hinder a movement of the respective spring means 130, 131 as a whole, but only to limit its radial deformation.

The clamping slides 132 to 135 are each individually assigned to the openings 114 to 117. The clamping slide 132 is located in a channel in which it can move radially to the opening 114 in such a way that it either projects into the opening 114 in a clamping position or stands outside it in a release position. The same applies to the opening 115 and the clamping slide 133, the opening 116 and the clamping slide 134 as well as the opening 117 and the clamping slide 135. The clamping slides 132, and 134 as well as the clamping slides 133 and 135 are each connected in pairs to one another by a tension spring 137, 138 or are preloaded to their rest position outside the respective opening 114 to 117 by another spring means, not illustrated.

With their ends facing away from the openings 114 to 117, the clamping slides 132 to 135 are in contact with, for example, the cylindrical outer surface of the respective spring means 130, 131. This forms a sliding gear in which a displacement of the actuating rod 125 in FIG. 10 upwards forces the spring means 130, 131 apart, whereby the spring means 130, 131 in turn force the clamping slides 132, 134 or 133, 135 apart, so that their ends penetrate the bores 114 to 117. FIG. 9 illustrates this using the example of the slide 132, the opening-side end of which then moves into the hole 114 and penetrates there into a groove of the clamping bolt 118 with a trapezoidal cross section. Thereby, by interaction of the end of the clamping slide 132 with one of the groove flanks, the clamping bolt 118 is drawn vertically into the opening 114, whereby the base surface of the guide body 119 is attracted to the upper surface 126. In addition, the clamping bolt 118 undergoes a slight lateral elastic deformation so that its head 118a bears against the bore wall of the opening 114 at a point opposite the clamping slide 132. This spreads the clamping bolts in the openings 114 to 117 away from each other, causing the guide body 119 to find its desired position, i.e. its zero position.

The movement of the actuating rod is transmitted to the clamping slides 132 to 135 by the spring means 130, 131. The wedge 136, the spring means 130, 131 and the clamping slide form a reduction gear. In other words, the distance covered by each clamping slide 132 to 135 during clamping is at most as great as the distance covered by the actuating rod 125, but preferably less. This is achieved by appropriate inclination of the clamping surfaces 128, 129 and by appropriate adjustment of the wedge angle between the end faces of the clamping slides 131/134, 133/135, which rest against the respective spring means 120, 121.

The through opening of the clamping plate 112 has an internal thread 139, 140 on each side. An abutment 141 is fixed in the internal thread 139, for example in the form of a screw, which is supported on the end face of the actuating rod 125 via a compression spring 142. An actuating screw, which is screwed into the internal thread 140, engages the other end face of the actuating rod 125. By turning the actuating screw 143, the axial position of the actuating rod 125 can be adjusted specifically in order to actuate the clamping slides 132 to 135 by means of the wedge 136 and via the spring means 130, 131.

The clamping plate described in this respect works as follows:

To connect the workpiece clamping device 111 to the clamping plate 112, the workpiece clamping device 112 is first placed on the clamping plate 112 in such a way that the clamping bolts 118 move into the openings 114, 115, 116, 117 and the guide body 119 (or a workpiece provided directly with pins 118) rests on the upper surface 126. Initially, the clamping slides 132 to 135 are in the release position. To tighten the workpiece clamping device 111, the screw 143 is now actuated in such a way that the wedge 136 forces the spring means 130, 131 apart, which in turn force the clamping slides 132 to 135 apart so that they move into the tightening position according to FIG. 9 and tighten the clamping bolts 118. The spring means 130, 131 compensate for any tolerances of the clamping bolts 118 and also of the clamping slides 132 to 135, which are guided in their channels with little clearance. The spring means 130, 131 distribute the force emanating from the wedge 136 largely evenly over all the clamping slides 132 to 135. This is further assisted if the wedge 136 is held with some lateral clearance on the actuating rod 125. For this purpose, the actuating rod may have a reduced-diameter or flattened section over which the wedge 136 engages. For example, the wedge 136 may be U-shaped for this purpose to sit on the actuating rod 125 like a rider.

When the tightening device is tightened, the spring means 130, 131 move radially outwards with respect to the actuating rod 125. The spring means 130, 131 thereby entrain the stop means 130', 131' in their interior in the same direction. As the actuating force increases, the spring means 130, 131 begin to deform slightly from their circular shape in the relaxed state. They can come into contact with the respective stop means 130', 131' at one or more points and can be supported there, so that no further deformation occurs. The spring means 130, 131 thus have a stroke limitation. The maximum spring travel is defined by the annular gap formed between the respective stop means 130', 131' and the spring means 130, 131. The spring force of the spring means 130', 131' can depend non-linearly on the radial deformation. In particular, the spring characteristic can be progressive or digressive.

The embodiment example described above has a tightening device 124 for four openings 114, 115, 116, 117. However, several such tightening devices 124, 124' can also be provided in the clamping plate, as illustrated in the embodiments of FIGS. 11 and 12. FIG. 11 essentially illustrates a clamping plate 123 with a duplication of the tightening devices and the corresponding openings 114 to 117 and 114' to 117'. The above description applies accordingly to the formation of the associated tightening device 124. It further applies accordingly to the tightening device 124', which is actuated by the same actuating rod 125 extended here. The clamping plate 123 can be further enlarged by further doubling of the clamping system, which in turn can be lined up with one another as FIG. 12 illustrates with the aid of the clamping plates 123', 123". The previous description applies accordingly to the tightening devices, each of which being associated with four clamping openings 114', 115', 116', 117'.

The clamping plate 112 according to the invention has a tightening device 124 for tightening clamping bolts 118. The clamping plate 112 has a plurality of clamping openings 114, 115, 116, 117, with which a tightening device 124 is associated for clamping bolts seated in the openings 114 to 117. The tightening device 124 comprises clamping slides 132 to 135, which are movable radially to the respective openings 114 to 117 with little clearance in corresponding channels of the clamping plate 112. A movably arranged wedge 136, which acts on the clamping slides 132 to 135 via slightly resilient rollers, rings or other resiliently formed bodies, serves to move the clamping slides 132 to 135. A stop means 130', 131', for example in the form of a bolt, which passes through the spring means 130, 131, serves to limit the deformation of the corresponding spring means 130 to 131. The bolt is preferably oriented at right angles to the upper surface 126 serving as a support surface. A gap formed between the spring means and the stop means limits the spring stroke of the spring means. This allows the spring means to compensate for existing manufacturing tolerances or other tolerances in the tightening device or on the clamping bolts on the one hand and to transmit the required clamping forces on the other.

LIST OF REFERENCE SIGNS 10 workpiece holding device
11 clamping device
12 support body
13 holding side
14 attachment side
15 holding device 16 Workpiece
17 clamping jaw
18 clamping bolt
19 conical end section
20 receptacle hole
21 face cavity
22 impingement surface
23 conical section
24 tapering section
28 base body
29 clamping side
30 abutment surface
31 counter abutment surface
32 hole bottom
33 elastically deformable element
36 clamping body
36a first clamping body
36b second clamping body
36c third clamping body
36d fourth clamping body
37 guide channel
38 channel wall
39 channel bottom
40 Cover
41 cover holding cavity
42 guide wall section
43 guide insert
50 first clamping body group
51 second clamping body group
52 operating device
53 clamping end
54 clamping surface
57 operating screw
58 Nut
59 main body
60 main body surface
61 operating body end surface
62 operating body
63 Slant
64 operating end
65 clamping body end surface
70 biasing arrangement
71 biasing element
A axial direction
F release position
FZ traction force
FL longitudinal force
FX first force component
FY second force component
G1 first straight line
G2 second straight line
L1 first longitudinal axis
L2 second longitudinal axis
L3 third longitudinal axis
L4 fourth longitudinal axis
P1 first intersection point
P2 second intersection point
P3 third intersection point
P4 fourth intersection point
S clamping position
x first direction
y second direction
z third direction
  110 Device
  111 Workpiece clamping device
  112, 113 Clamping plates
  114-117 Openings
  118 Clamping bolt
  119 Guide body
  120, 121 Clamping jaws
  123 Clamping plate
  124 Tightening device
  125 Actuating rod
  126 Upper surface
  127 Through opening
  128, 129 Inclined surfaces
  130, 131 Spring means
  130', 131' Stop means
  132-135 Clamping slides
  136 Wedge
  137, 138 Spring means
  139, 140 Internal thread/anchoring structure
  141 Abutment
  142 Compression spring
  143 Actuating screw

What is claimed is:

1. A clamping plate for receiving at least one workpiece clamping device or a workpiece, the clamping plate comprising:
a support surface for the at least one workpiece clamping device or the workpiece, the support surface is penetrated by a plurality of openings for receiving clamping bolts of the at least one workpiece clamping device, clamping slides being arranged in the clamping plate, the clamping slides each project with one end into one of the plurality of openings in a clamping position and are located outside the one of the plurality of openings in a release position,
a clamping wedge, which is movably arranged in the clamping plate and is operatively connected to the clamping slides via a hollow body.

2. The clamping plate according to claim 1, wherein the support surface is formed as a flat reference surface.

3. The clamping plate according to claim 1, wherein each of the plurality of openings has a reference surface on its a respective side opposite a respective one of the clamping slides.

4. The clamping plate according to claim 1, wherein each of the clamping slides is preloaded towards the release position.

5. The clamping plate according to claim 1, wherein the clamping wedge has two clamping surfaces arranged diametrically opposite each other, a distance between which is variable along a direction of movement.

6. The clamping plate according to claim 1, wherein the hollow body is a body formed resiliently yielding in several directions.

7. The clamping plate according to claim 1, wherein the hollow body is an annular body.

8. A clamping plate for receiving at least one workpiece clamping device or a workpiece, the clamping plate comprising:
a support surface for the at least one workpiece clamping device or the workpiece, the support surface is penetrated by a plurality of openings for receiving clamping bolts of the at least one workpiece clamping device, clamping slides being arranged in the clamping plate, the clamping slides each project with one end into one of the plurality of openings in a clamping position and are located outside the one of the plurality of openings in a release position,
a clamping wedge, which is movably arranged in the clamping plate and is operatively connected to the clamping slides via a hollow cylinder.

9. The clamping plate according to claim 1, wherein the hollow body has a constant wall thickness.

10. The clamping plate according to claim 1, wherein a stop means is provided in the hollow body and arranged stationary in the clamping plate.

11. The clamping plate according to claim 10, wherein the shollow body and the stop means are formed to fix an annular gap together.

12. The clamping plate according to claim 2, wherein each of the plurality of openings has a reference surface on a respective side opposite a respective one of the clamping slides.

13. The clamping plate according to claim 12, wherein each of the clamping slides is preloaded towards the release position.

14. The clamping plate according to claim 13, wherein the clamping wedge has two clamping surfaces arranged diametrically opposite each other, a distance between which is variable along a direction of movement.

15. The clamping plate according to claim 14, wherein the hollow body is a body formed resiliently yielding in several directions.

16. The clamping plate according to claim 11, wherein the stop means is a rigid body.

17. The clamping plate according to claim 11, wherein the stop means is a bolt.

18. The clamping plate according to claim 10, wherein the stop means is a rigid body.

19. The clamping plate according to claim 10, wherein the stop means is a bolt.

* * * * *